United States Patent Office 3,138,750
Patented June 23, 1964

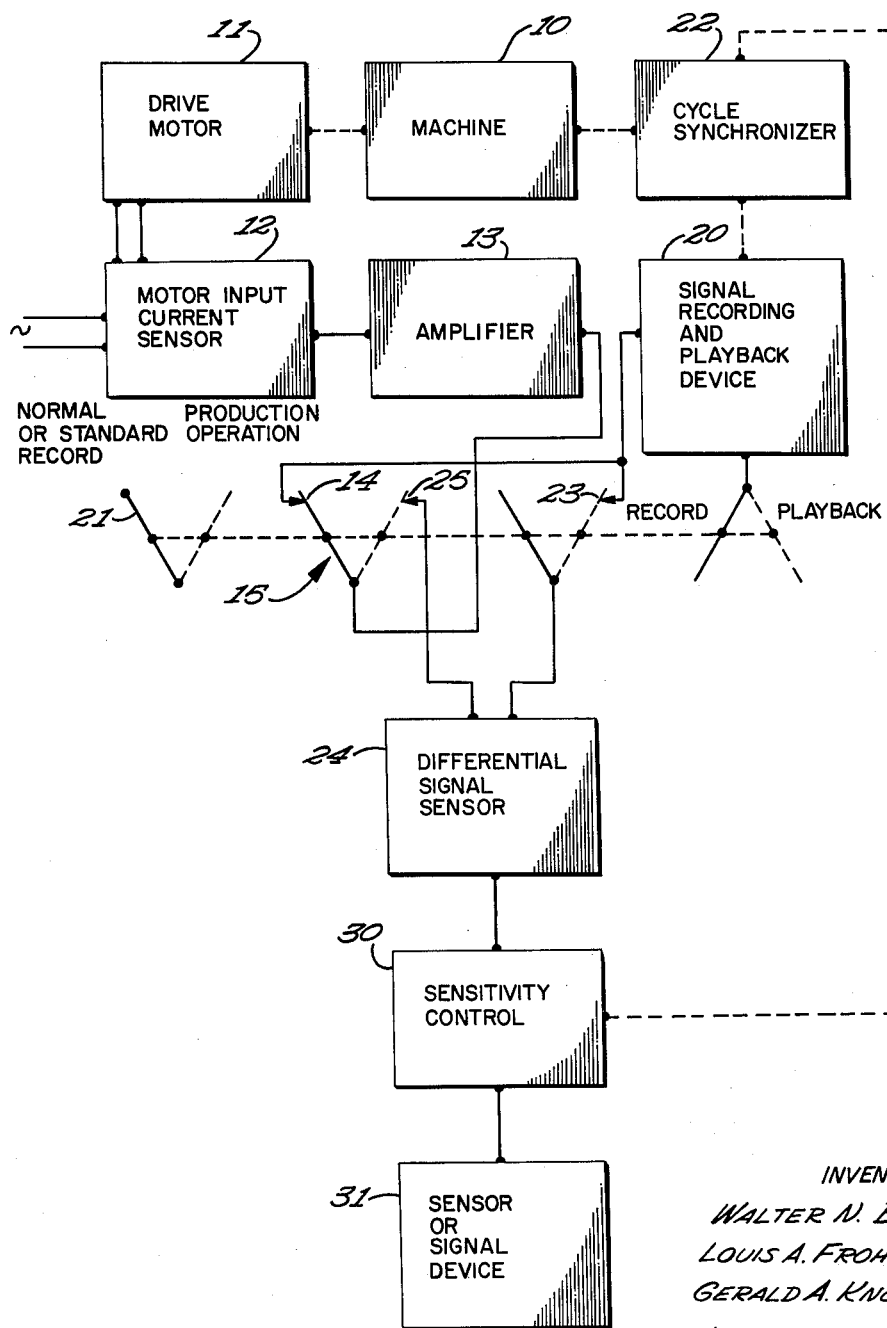

3,138,750
PROGRAMMED MACHINE WITH MALFUNCTION DETECTION AND CONTROL APPARATUS
Walter N. Borger, Minneapolis, Minn., Louis A. Frohbach, Florence, Mass., Gerald A. Knoblauch, Torrance, Calif., John O. Lenz, Minneapolis, Minn., and Felix L. Mertesdorf, Arcadia, Calif., assignors to Minneapolis-Honeywell Regulator Company, Minneapolis, Minn., a corporation of Delaware
Continuation of application Ser. No. 695,902, Nov. 12, 1957. This application Nov. 17, 1959, Ser. No. 853,515
2 Claims. (Cl. 318—162)

The present application is a continuation application of the application for Walter N. Borger et al., Serial No. 695,902 filed November 12, 1957 entitled Control Apparatus, now abandoned.

The present invention is concerned with an improved machine control system wherein a recording is made of the variations in a machine operating condition throughout a complete cycle of a normal or standard operation. During subsequent production operating cycles, the variations in the machine operating condition are compared with the recorded machine operating condition. Variations and deviations between the standard operation and the production operation are detected.

With the increase in automatic machinery there is a constant need for improved means for sensing deviations from the normal or standard operation of an automatic machine. While it is possible to check the product or piece which the machine produces by quality control methods, this does not alleviate the condition where something happens during the production cycle which if allowed to continue would cause serious damage.

In the present invention, a responsive device records a machine operating condition signal throughout a standard cycle of operation. For subsequent cycles of the machine operation, the machine operating condition signal is compared with the recorded condition signal taken during the standard operation, and any difference between the two signals is detected indicating the presence of a malfunction condition. A further improvement is to provide a sensitivity control which is adjusted throughout the operating cycle of the machine to allow for different levels of variation between the standard recorded condition signal and the production operating condition signal during different portions of the total operating cycle of the machine.

An object of the present invention is to provide an improved automatic machine control for detecting an abnormal operation of a machine.

Another object of the present invention is to provide a machine control for determining a malfunction in the machine operation in which a standard operation condition is compared with a production operation condition and any deviation is sensed.

And still another object of the present invention is to provide in a machine control system a means of recording a variation in a motor operating condition throughout a normal operation cycle and when the machine operating condition variations of subsequent operating cycles of the machine vary from the normal more than a predetermined amount, abnormal operation of the machine is detected.

These and other objects will become apparent upon a study of the following specification and drawing of which a single figure is a block diagram of the present invention.

Referring to the single figure a machine 10 is driven by a drive motor 11. The machine might be any conventional production machine such as an automatic screw machine which has a number of operations to be performed throughout a continuous operating cycle. The drive motor being shown schematically as an electric motor provides the power for operating the machine throughout its cycle. The manner of control for the machine is of no concern. Machine 10 might have any type of programming control apparatus to provide repeating cycles of operation according to some predetermined schedule. Such independent programming control apparatus, which is not shown, controls the machine through a series of operations making up one cycle of operation. A motor input current sensor or machine operating condition responsive device 12 responds to variations in the input current to motor 11. The machine operating condition responsive device could very well be a device responsive to torque, hydraulic fluid pressure, sound, and other conditions of machine operation which vary depending upon the operating condition of the machine. For explanation purposes the invention is disclosed with a motor input current sensor which senses the variations in the motor current as the load on the motor varies with the load on the machine.

An output of the motor current sensor is fed into a conventional amplifier 13 to amplify the relatively small signal of motor condition sensor 12. The amplifier output is connected through one switch 14 of a gang operated bank of switches 15 to a signal recording and playback device 20. When the main control lever 21 of the gang switches is in the standard record position switch 14 is closed. The recording and playback device is a conventional type such as a magnetic tape or wire for recording the variations in the amplified motor operating condition signal throughout the operating cycle of the machine 10. When the gang switch lever 21 is in the standard record position the signal recording and playback device is in the record position so that the signal output of the amplifier is recorded. Connected to be in synchronism with the operating cycle of machine 10 is a cycle synchronizer 22 which insures that the signal recording and playback device will start at its initial position or at the beginning of the record each time the machine 10 begins an operating cycle.

Let us assume that a standard or normal operation of the machine is taking place as determined by an independent program control apparatus which is not shown. In the case of an automatic screw machine a piece of material would be inserted in the machine either manually or automatically and the machine would be started to operate through one complete cycle as determined by the programming control apparatus. During this operating cycle, the variations in the machine operating condition or motor input current are recorded by signal recording device 20. In the case of an automatic screw machine, during one operation of the complete programmed cycle, there may be a heavy load and the output of sensor 12 might be large, while during another operation of the cycle of machine 10, the load may be small reducing the output of sensor 12. These variations in output of sensor 12 are recorded throughout the complete programmed operating cycle of machine 10 to produce a normal or standard record of the motor operating condition variation. Of course, during the making of this standard record the machine would be checked very closely by a machine operator, and after the cycle was completed, the production piece whatever it might be would be checked to determine whether a satisfactory standard record was obtained.

After the standard record was obtained, lever 21 is thrown to the right to the production operation. This transfers the device 20 from recording to playback and also the playback output of device 20 connected through switch 23 to one of the inputs of a differential signal sensor 24. At the same time the output of amplifier 13 is disconnected from the device 20 and is connected through switch 25 to a second input of the differential signal sensor. The differential signal sensor is of a conventional type having means for receiving two signals and having an output depending upon the deviation or difference between these input signals.

With the lever 21 in the production operation position, the machine is started on its normal production operation under the control of the independent programmed control apparatus. Each time it began a cycle of operation, the cycle synchronizer initiates the operation of the playback device so that simultaneously the standard record of machine operating condition which was previously made and the present variations in machine operating condition throughout the programmed operating cycle are fed into the differential signal sensor.

Connected to the differential signal sensor is a sensitivity control 30 and a signal device or sensor 31. By means of the sensitivity control, a predetermined portion of the differential between the standard signal and the present production signal is selected, and if the predetermined portion signal exceeds some predetermined value, the device 31 is energized to give an appropriate response.

While in the production operation let us assume that during the drilling operation of the automatic screw machine, a tool became dull and the motor load increased. This would produce a motor operating condition or input current considerably different from the standard operation. The differential signal sensor senses this deviation. When the output of sensor 24 exceeds the predetermined amount selected by the sensitivity control, sensor device 31 is operated to sound a signal or turn off the machine.

The sensitivity control is connected into the motor drive of the machine; so that, during the machine operating cycle, the sensitivity control is adjusted to provide for different levels of sensitivity. Thus different levels of deviations of the production operation motor operation signal and standard signal can be selected to cause operation of signal device 31. This is quite important in certain operations of the machine such as during a roughing operation where the character of the material being worked on changes the motor load considerably. As the roughing operation is not critical, a larger variation is selected, and the differential signal sensor output could be quite high before any output would be available to device 31. As the machine operation continued to some other type of operation such as a finishing operation, the motor load is more critically controlled by making the sensitivity control very sensitive by using a large portion of the output of sensor 24. A small differential between the signals fed into the sensor 24 would then bring about operation of device 31.

The present invention readily detects a number of malfunction conditions occurring in an automatic machine and greatly increases the automatic machine productivity. Furthermore the amount of scrap is reduced and tool breakage is minimized. In any automation program where the elimination of manpower and the provision of a machine which will operate continuously to produce high quality products, an invention of this type is of great importance.

While the invention has been disclosed in one particular manner there are other obvious modifications which would be apparent to one skilled in the art. Therefore it is intended that the present invention be limited only by the scope of the appended claims in which—

I claim:

1. In a malfunction sensing device for use with a machine having selected mode of operation determined by an independent controller, machine operating condition responsive means responsive to variations in a machine operating condition which is indicative of the load on the machine throughout an operating cycle of the machine as determined by the independent controller, recording means, means selectively connecting said responsive means to said recording means to record the variations in a first output of said responsive means occurring throughout one complete scheduled cycle of operation of the machine when it is operating in a normal manner, playback means for playing back in a repeat fashion said recorded output of said responsive means during subsequent normal scheduled operation cycle of the machine, differential sensing means, means connecting said recorded output of said playback means and said first output of said responsive means to said differential sensing means during subsequent scheduled operations of the machine so that the variations in said first and said recorded outputs are compared and any deviation sensed, malfunction signal means, and means connecting said malfunction signal means to said differential sensing means so that when the difference between said first output of said responsive means during a subsequent operation and said recorded output of said responsive means during the standard operation is above a predetermined value said signal means functions in a manner indicative of a malfunction condition, and means for varying said predetermined value throughout said operating cycle of the machine in accordance with a predetermined schedule.

2. In a malfunction sensing device for an automatic machine having a selected schedule of operation which is determined by an independent controller, machine operating condition responsive means, said condition being indicative of the load of the machine, recording means, means selectively connecting said responsive means to said recording means to record the variations in an output of said responsive means occurring throughout one cycle of the selected schedule of operation of the machine when it is operating in a normal manner under the control of the controller, playback means for playing back in a repeat fashion the recorded output of said responsive means during the normal operation cycle of the machine, differential sensing means, means connecting an output of said playback means and said output of said responsive means to said differential sensing means during an operating cycle of the machine on subsequent operations so that the variations in the output of said responsive means during the normal operating cycle and the subsequent cycles of the machine are compared and any deviation sensed, sensor means connected to said differential sensing means to be responsive to a predetermined difference in the normal recorded output and the subsequent operating output for providing a signal indicative of the presence of an abnormal condition, and means associated with said sensor means and scheduled by the controller for resetting said detection means to vary said predetermined difference needed to produce said signal throughout an operating cycle of the machine in accordance with a prearranged schedule synchronized with the machine operation.

References Cited in the file of this patent
UNITED STATES PATENTS

| | | |
|---|---|---|
| 2,493,543 | Merchant | Jan. 3, 1950 |
| 2,537,770 | Livingston | Jan. 9, 1951 |
| 2,866,145 | Peaslee et al. | Dec. 23, 1958 |